US008934734B1

(12) United States Patent
Ioffe et al.

(10) Patent No.: US 8,934,734 B1
(45) Date of Patent: *Jan. 13, 2015

(54) VIDEO IDENTIFICATION THROUGH DETECTION OF PROPRIETARY RIGHTS LOGOS IN MEDIA

(75) Inventors: Sergey Ioffe, Mountain View, CA (US); Krzysztof Kulewski, Warsaw (PL)

(73) Assignee: Google Inc., Mountain View, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/433,107

(22) Filed: Mar. 28, 2012

Related U.S. Application Data

(63) Continuation of application No. 12/398,868, filed on Mar. 5, 2009, now Pat. No. 8,175,413.

(51) Int. Cl.
  *G06K 9/20* (2006.01)
  *G06K 9/36* (2006.01)
(52) U.S. Cl.
  USPC .......................................................... 382/283
(58) Field of Classification Search
  USPC .......................................................... 382/283
  See application file for complete search history.

(56) References Cited

U.S. PATENT DOCUMENTS

| | | | | |
|---|---|---|---|---|
| 5,953,076 A | * | 9/1999 | Astle et al. | 348/584 |
| 6,658,057 B1 | * | 12/2003 | Chen et al. | 375/240 |
| 7,020,336 B2 | * | 3/2006 | Cohen-Solal et al. | 382/204 |
| 8,175,413 B1 | * | 5/2012 | Ioffe et al. | 382/283 |
| 2003/0076448 A1 | * | 4/2003 | Pan et al. | 348/589 |
| 2005/0078223 A1 | * | 4/2005 | Liu et al. | 348/701 |
| 2007/0052854 A1 | * | 3/2007 | Yeh et al. | 348/565 |
| 2007/0261075 A1 | * | 11/2007 | Glasberg et al. | 725/22 |
| 2009/0232354 A1 | * | 9/2009 | Camp et al. | 382/103 |
| 2010/0166257 A1 | * | 7/2010 | Wredenhagen | 382/103 |
| 2013/0097625 A1 | * | 4/2013 | Thorwirth et al. | 725/25 |

* cited by examiner

*Primary Examiner* — John Strege
(74) *Attorney, Agent, or Firm* — Fenwick & West LLP

(57) ABSTRACT

Proprietary rights logos are detected in a video. The video is divided into a plurality of regions that are analyzed for generic proprietary rights logo features. A confidence mask is generated that comprises a plurality of scaling factors, each scaling factor corresponding to a region of the video and indicating a likelihood that the corresponding region of the video includes a proprietary rights logo. The scaling factors of the confidence mask are applied to the video data to generate an altered video. The altered video is analyzed to determine a confidence measure that the video includes a reference proprietary rights logo.

26 Claims, 7 Drawing Sheets

US 8,934,734 B1

VIDEO IDENTIFICATION THROUGH DETECTION OF PROPRIETARY RIGHTS LOGOS IN MEDIA

RELATED APPLICATIONS

This application is a continuation of and claims priority to U.S. application Ser. No. 12/398,868, filed on Mar. 5, 2009, the entirety of which is incorporated by reference herein.

BACKGROUND

1. Technical Field

The present invention generally relates to the field of video processing, and, more particularly, relates to identifying videos through detection of superimposed logos or other indicia.

2. Description of the Related Art

Video hosting services allow users to upload videos for viewing by other users. A user uploading a video typically provides information describing the video, such as a short description, keywords, and/or tags. In some cases, the uploaded video includes a segment of a television broadcast, film, or other media in which others have ownership or usage rights; the user uploading such a video may not correctly identify the source of the video as a particular broadcaster, television station, studio, or the like. Identification of the source of a video is desirable to ensure compliance with licensing arrangements and copyright laws.

Some conventional methods for identifying a video, and hence its source, rely on video fingerprinting. Such methods conventionally maintain a reference database of fingerprints derived from previously identified videos. To identify a video, a fingerprint for the unidentified video is compared against the fingerprints in the reference database in an attempt to find a match for the video. However, such methods are unable to identify any video for which a matching video is not already included in the reference database. Hence, these methods are not entirely adequate for a video hosting site, particularly one that receives many new videos at a high rate.

SUMMARY

A computer implemented method detects proprietary rights logos in videos. A proprietary rights logo is a graphical logo often present in visual media such as a logo for a television station, a television or film studio, or other media producer or distributor who has proprietary rights in the media. Proprietary rights include any form of copyrights, ownership rights, license rights, royalty rights, or other legal rights in the media. Video data and logo model data for reference proprietary rights logos are stored in a computer memory comprising a computer-readable storage medium. The video data can comprise pixel data for one or more video frames that contain a proprietary rights logo. The logo model data can comprise feature vectors and templates for reference proprietary rights logos. A mask generator generates a confidence mask comprising a plurality of scaling factors for a video. Each scaling factor corresponds to one region of the video and indicates a likelihood that the corresponding region of the video includes a proprietary rights logo. A scaling factor for a region is determined by analyzing the region to detect generic proprietary rights logo features. A logo detector applies the scaling factors of the confidence mask to the video data for the corresponding regions of the video to generate an altered video. Applying a scaling factor to a region can comprise multiplying video data for the region by the scaling factor. The logo detector then determines from the altered video a confidence measure as to whether the video includes a known logo by computing descriptors for interest points detected in the altered video and comparing them to stored descriptors for reference proprietary rights logos. The logo detector also applies logo templates to verify positions, scales, and/or orientations of the interest points. The logo detector outputs a logo report including a number of reference proprietary rights logos that were detected, a confidence measure for each detected reference proprietary rights logo, and the duration of appearance for each detected reference proprietary rights logo.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

Architectural Overview

Figure 1:
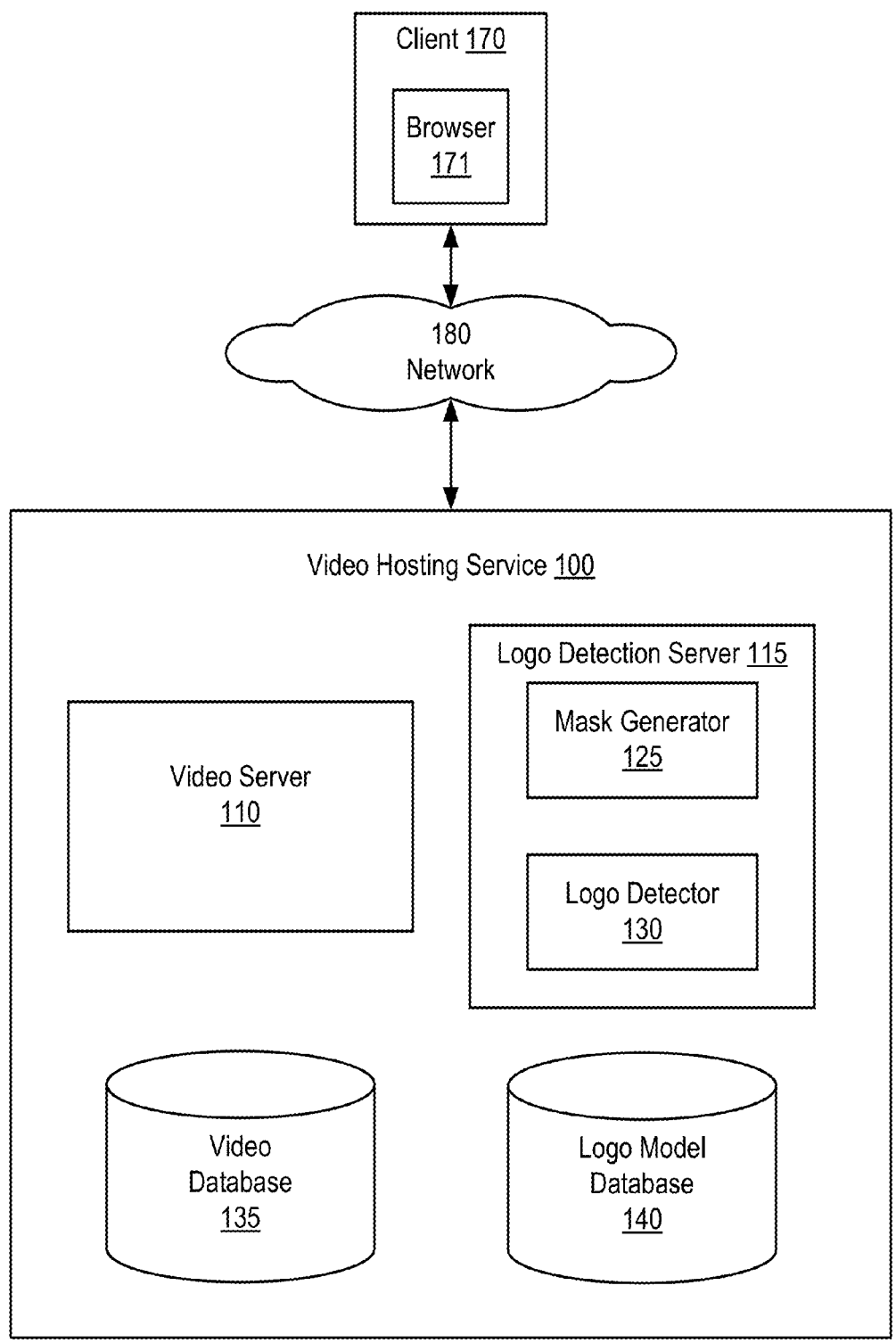
FIG. 1 illustrates a block diagram of one embodiment of a system for determining if a video includes one or more reference proprietary rights logos.

FIG. 1 illustrates an exemplary computing environment for a system for detecting and identifying reference proprietary rights logos in videos. In the embodiment of FIG. 1, a video hosting service 100 communicates over a network 180 with one or more client devices 170; each client 170 includes a browser 171. The network 180 is typically the Internet, but may also be any network, including but not limited to any combination of a LAN, a MAN, a WAN, a mobile, a wired or wireless network, a private network, or a virtual private network. Only a single client 170 is shown, but in practice there are many (e.g., millions) of clients that can communicate with and use the video hosting service 100. The browser 171 can include a content player (e.g., Flash™ from Adobe Systems, Inc.), or any other player adapted for the content file formats used by the video hosting service 100. The video hosting service 100 receives uploaded videos from some of the clients 170, and provides videos as well to clients 170 for viewing.

The video hosting service 100 determines if the videos include any logos for broadcast or protected media such as a logo for a television station, a television or film studio, or other media producer or distributor. Many television programs are broadcast with an embedded or overlaid logo in some region of the picture that identifies a broadcaster (e.g., a national network such as NBC™ or a local affiliate in the bottom right corner of the television screen) or other entity that may have rights to the media and/or its distribution. Such a logo is referred to hereinafter as a proprietary rights logo. A video that is a reproduction of or is otherwise based on such a television broadcast may be subject to various licensing and copyright requirements. Hence, determining if an uploaded video contains a proprietary rights logo can beneficially aid in efforts by the video hosting service 100 to comply with various licensing and copyright requirements that may apply to the video. A logo is physical, real world entity, as it has, for example, a visual appearance, including shape and color characteristics, and it persists over time. A logo is comprised, for example, of data that is encoded in the underlying media (e.g., pixel color values in a movie file). Similarly, videos are also real world entities having similar physical characteristics and data.

In one embodiment, the video hosting service 100 stores and processes video and logo model data. As videos and logos are both real world entities, the video data and logo model data represent real world entities. Hence, the video hosting service 100 transforms data representing real world entities as it processes video data and logo model data. One embodiment of the video hosting service 100 includes a video server 110, a logo detection server 115, a video database 135 and a logo model database 140.

The video database 135 and logo model database 140 are communicatively coupled to the network 180 and can be implemented as in any device or combination of devices capable of persistently storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here.

The video database 135 stores data for a plurality of videos. Each video comprises video data that includes pixel data for frames of the video. Typically, pixel data comprises pixel values that determine the visual appearance of pixels of the video frames. Pixel values can comprise multi-dimensional data based on a color space; in one embodiment the pixel values are stored in an RGB color space and operated upon using HSL or HSV representations (e.g., the RGB color values are transformed into the HSL or HSV color space). Pixel values can also be based on other conventional color spaces and operated upon using other representations.

The logo model database 140 stores logo model data for a plurality of proprietary rights logos. A proprietary rights logo for which data is stored in the logo model database is referred to herein as a reference logo. For example, the logo model database 140 can store logo model data for reference logos of television networks, reference logos of local affiliates of the television networks, or reference logos of other media producers or distributors. In one embodiment, logo model data for a reference logo comprises descriptors, wherein a descriptor is a multidimensional feature vector comprising a vector of real numbers that describes one or more visual characteristics or graphical elements of the reference logo. For example, a descriptor can represent a color, luminosity, shape, pattern, edge, texture, or other feature of a reference logo. In addition to descriptors, logo model data for reference logos can also comprise logo templates. Television broadcasts, for example, typically place the logo of a network in one or more predetermined locations such as the bottom right-hand corner of a video frame. Hence, a stored logo template indicates a reference position, scale, and/or orientation of a reference logo within a video frame and can help verify that the reference logo has been detected.

The video server 110 and logo detection server 115 are communicatively coupled to the network 180 and can be implemented as one or more server class computers. The server class computers include one or more high-performance CPUs and 1 G or more of main memory, as well as 500 Gb to 2 Tb of storage. An open-source operating system such as LINUX is used. The operations of the video hosting service 100 as described herein can be controlled through either hardware (e.g., dedicated computing devices or daughterboards in general purpose computers), or through computer programs installed in computer storage on the servers of the service 100 and executed by the processors of such servers to perform the functions described herein. One of skill in the art of system engineering and video analysis will readily determine from the functional and algorithmic descriptions here the construction and operation of such computer programs.

In one embodiment, the video server 110 receives videos uploaded by clients 170 over the network 180 and processes them for storage by the video database 135. The video server 110 also receives requests for videos from clients 170 through the network. In response to received requests, the video server 110 retrieves videos stored by the video database 135 and distributes them to clients 170 over the network 180. Some of the videos received and distributed by the video server 110 include one or more proprietary rights logos.

In one embodiment, the logo detection server 115 processes videos stored by the video database 135 to determine if they include one or more proprietary rights logos. The logo detection server 115 includes a mask generator 125 and a logo detector 130. Given a video for processing, the mask generator 125 divides video frames of the video into regions, and determines for each region (or a set of regions) a corresponding likelihood (e.g. measure of probability) that the region include a proprietary rights logo (or a portion thereof).

Figure 2A:
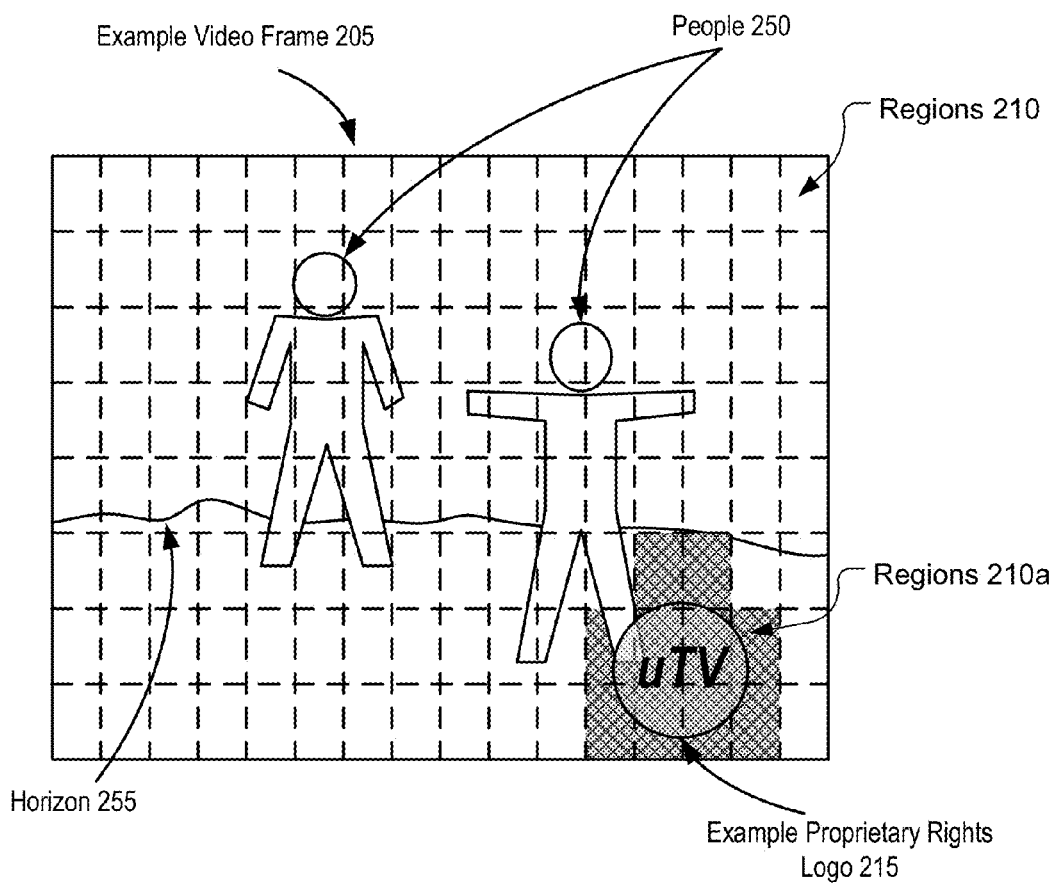
FIG. 2A illustrates a video frame divided into regions in accordance with one embodiment.

A region is a rectangular portion of a video frame, such as, for example, a 52×48 pixel portion. An individual video frame at 520×480 pixel resolution will thus have 100 regions. Regions of other dimensions or shapes are also possible, as are video frames of other resolutions. In one embodiment, a region can comprise a single pixel. In some embodiments, the mask generator 125 resizes video frames having pixel resolutions greater than a maximum resolution to create resized frames having reduced resolutions prior and then divides the resized frames into regions. For example, the mask generator 125 can reduce the resolution of any video frames having greater than 520×480 pixel resolution to create resized frames having 520×480 pixel resolution. FIG. 2A illustrates an example video frame 205 that has been divided into 128 regions. The dashed lines of FIG. 2A represent boundaries between regions 210. As shown in FIG. 2A, the example video frame 205 is from a video that includes images of two people 250. The people are outside, so the example video frame 205 also includes a horizon 255. FIG. 2A also shows that the example video frame 205 includes an example proprietary rights logo 215 for "uTV." The example proprietary rights logo 215 is semi-translucent, partially obscuring the foot of one of the people in the video. As shown in FIG. 2A, the example proprietary rights logo 215 is partially in each of regions 210a (gray shaded regions). For the sake of illustrative clarity, the example video frame 205 is shown as divided into 128 regions. However, different embodiments can divide video frames into any number of regions.

The mask generator 125 determines a likelihood that a region includes a proprietary rights logo (or a portion thereof) based on a variety of graphical features that are, in general, typical of proprietary rights logos, referred to herein as generic logo features. For example, as proprietary rights logos are typically bright relative to their surroundings, brightness relative to surroundings represents a generic logo feature, that is features that are typically present in most proprietary rights logos. Thus the presence of such generic features increases the likelihood that a proprietary rights logo is present. Hence, in one embodiment, the mask generator 125, rather than attempting to detect any particular reference logo, analyzes the video for generic logo features, beneficially enabling further processing techniques to focus on some regions of the video more than others. The mask generator 125 can configured to determine a likelihood for each region in a frame, or for a selected subset of regions (e.g., regions in the lower right quadrant of frame).

As used herein, a logo cue is a computational output associated with a generic logo feature. For example, for the generic logo feature of brightness relative to surroundings, a corresponding logo cue can comprise a magnitude in the value dimension of time-averaged HSV pixel data for pixels in a first region of the video that exceeds a magnitude in the value dimension of time-averaged HSV pixel data for surrounding pixels by some threshold.

As detailed below, many logo cues are possible based on a variety of generic logo features. In one embodiment, the mask generator 125 computes a scaling factor for each region of the video based whether or not the region includes any generic logo features by evaluation one or more associated logo cues. In one embodiment, the scaling factor for a region is proportional to the likelihood that the region includes a proprietary rights logo. The mask generator 125 generates a confidence mask comprising the scaling factors for each region.

Figure 2B:
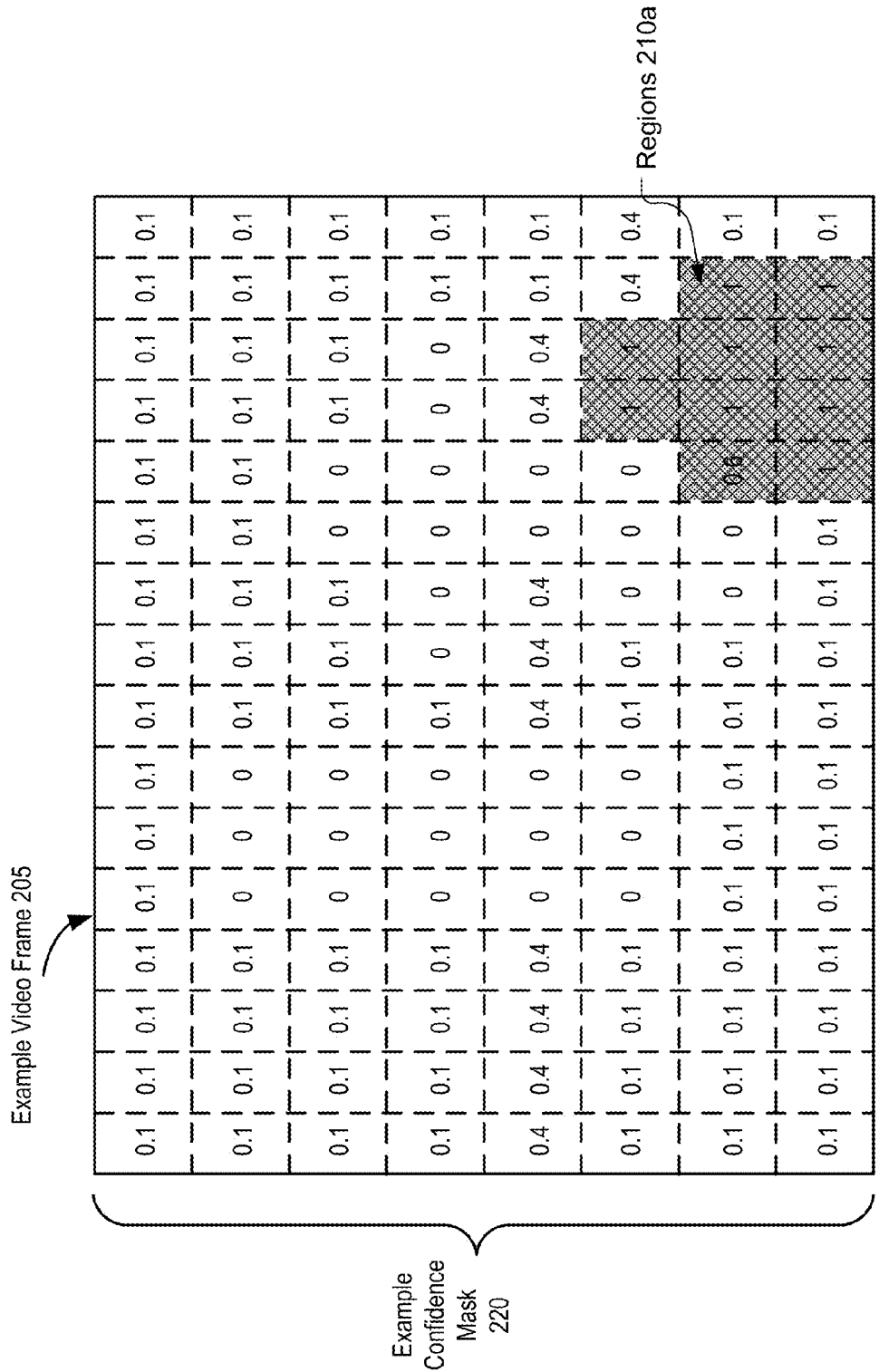
FIG. 2B illustrates a confidence mask for a video frame in accordance with one embodiment.

FIG. 2B illustrates an example confidence mask 220 for the video frame 205 of FIG. 2B. The numbers inside the regions of the video frame 205 represent scaling factors. In the embodiment shown in FIG. 2B, the scaling factors range from zero to one, with a higher scaling factor corresponding to a higher likelihood that the corresponding region includes a proprietary rights logo. More details regarding one embodiment for calculating scaling factors are provided below in reference to FIG. 3. The mask generator 125 forms the example confidence mask 220 using the scaling factors. In one embodiment, the example confidence mask 220 is a multidimensional vector that associates each region with a corresponding scaling factor. There is a single confidence mask for each processed video frame. Depending on the embodiment, the mask generator 125 can generate confidence masks for any number of video frames within a video.

The logo detector 130 analyzes video data to determine if the corresponding video includes one or more reference proprietary rights logos. In one embodiment, the logo detector 130 applies confidence masks generated by the mask generator 125 to corresponding video frames to generate altered video frames. The logo detector 130 computes descriptors for regions of the altered video frames and compares them to descriptors stored in the logo model database 140. The logo detector 130 can also compare an altered video frame to a logo template stored in the logo model database 140. In one embodiment, the logo detector 130 generates a logo report that identifies any reference logos detected in the video.

Numerous variations from the system architecture of the illustrated video hosting service 100 are possible. The components of the service 100 and their respective functionalities can be combined or redistributed. For example, the video database 135 and/or logo model database 140 can be distributed among any number of storage devices. Furthermore, the functionalities ascribed herein to the mask generator 125 and the logo detector 130 can be implemented using a single computing device or using any number of distributed computing devices communicatively coupled via a network.

Confidence Mask Generation

Figure 3:
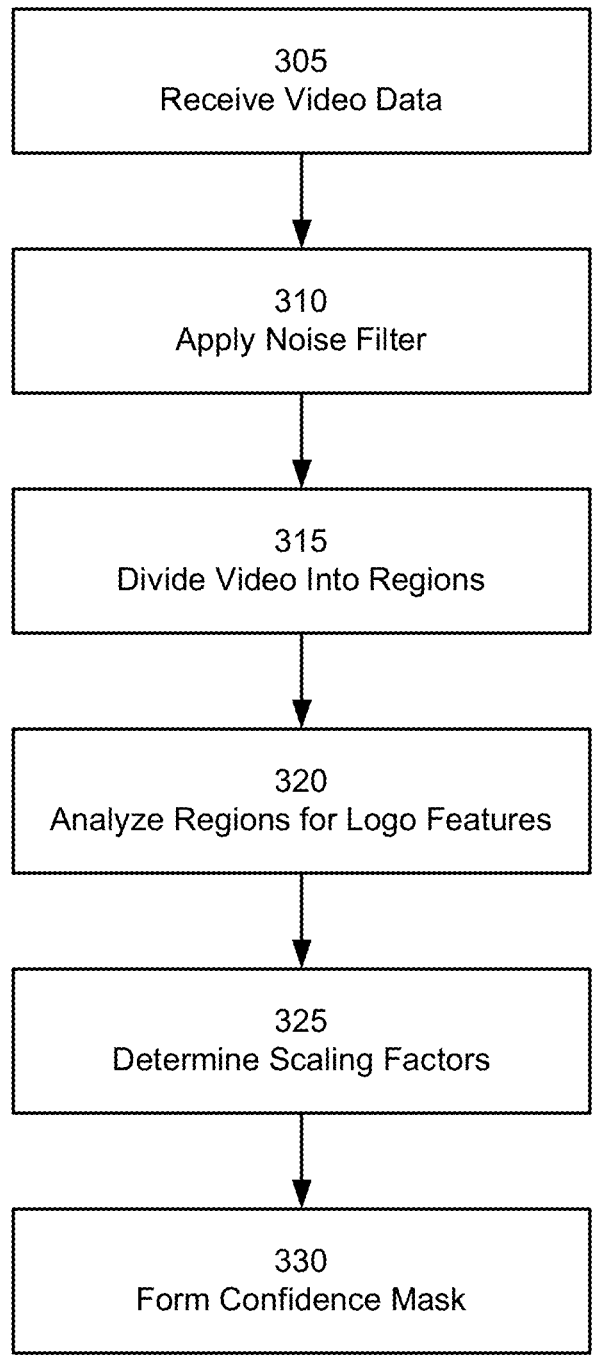
FIG. 3 illustrates one embodiment of a method for generating a confidence mask for a video.

FIG. 3 is a flowchart illustrating the operations of the mask generator 125 to generate a confidence mask according to one embodiment. Other embodiments can perform one or more steps of FIG. 3 in a different sequence. Moreover, other embodiments can include additional and/or different steps than the ones described herein.

The mask generator 125 receives 305 video data for a video from the video database 135. In some embodiments, the mask generator 125 applies 310 a noise filter to the video data. Suitable noise filtering techniques include Gaussian and median filtering techniques.

The mask generator 125 then divides 315 one or more frames of the video into a plurality of regions. As described above, a region is a rectangular portion of a video frame such as, for example, a 10×10 pixel portion. An individual video frame at 520×480 pixel resolution will thus have 2496 regions. An individual video frame of higher pixel resolution will result in more regions whereas an individual video frame of lower resolution will result in fewer regions. Regions of other dimensions or shapes are also possible, as are video frames of other resolutions. In one embodiment, a region can comprise a single pixel. In some embodiments, the mask generator 125 resizes video frames having pixel resolutions greater than a maximum resolution to create resized frames having reduced resolutions prior and then divides the resized frames into regions. For example, the mask generator 125 can reduce any video frames having greater than 520×480 pixel resolution to create resized frames having 520×480 pixel resolution.

The mask generator 125 analyzes 320 video data (e.g. pixel data) in each region to determine if the region includes any generic logo features. The mask generator 125 can analyze all regions of a frame, or a selected set of regions, such as those most likely to contain a proprietary rights logo, such as those regions in a particular portion of a frame (e.g., the lower right quadrant). Analyzing 320 a video region includes evaluating one or more logo cues. In one embodiment, a logo cue is a computational procedure designed to detect a generic logo feature when performed upon video data. As many generic logo features are possible based upon the reference logos stored by the logo model database 140, the mask generator 125 can evaluate any number of logo cues.

For example, as described above, many proprietary rights logos are relatively static and their color, shape, size, and/or position within a video remain unchanged for a certain period of time. A television network logo that is displayed in the bottom right-hand corner throughout a television broadcast is such a proprietary rights logo. Hence, a video region that is relatively static compared to surrounding regions has an increased likelihood of including a reference logo. Multiple logos cues can be evaluated to determine a stability of a region.

A logo cue based on stability can comprise a low (e.g. below some predetermined threshold) temporal variance of pixel values, either in absolute terms or relative to surrounding pixels over a predetermined window of time (e.g., 10 seconds). Accordingly, calculating a variance of pixel values can comprise calculating a variance of any dimension or combination of dimensions of the pixel data. A low temporal variance in a hue or color-specific dimension indicates that a region is stable in terms of color. Similarly, a low temporal variance in a value dimension of an HSV color space indicates that a region is stable in terms of brightness.

Another logo cue based on stability can comprise a motion vector of small magnitude for one or more pixels in a region, either in absolute terms or relative to surrounding pixels. In one embodiment, the mask generator compares the motion vector magnitude to a predetermined absolute and/or relative threshold. The mask generator 125 can calculate motion vectors for individual pixels or regions over a window of time using optical flow and/or other suitable techniques for quantifying pixel motion. A motion vector that is small in magnitude indicates little movement of the associated pixel or pixels and therefore reflects stability of the corresponding pixel or region.

Other logo cues can be based on a relative brightness and/or whiteness in comparison with surrounding pixels. This is especially true of a proprietary rights logo included in a video as a semi-translucent overlay such that it is visibly perceptible to a viewer but does not completely obscure the action behind the proprietary rights logo. Evaluating logo cues based on brightness and/or whiteness can include comparing pixel data for a dimension or combination of dimensions indicative of brightness and/or whiteness between pixels in a region and surrounding pixels. Depending on the type of pixel data, dimensions such as value dimensions, saturation dimensions, or color-specific dimensions of pixel data can indicate a brightness and/or whiteness of pixels. Pixel data can also be time-averaged over a window of time for the purposes of comparison. A determination that a region includes pixels that are consistently brighter and/or more predominantly white than the surrounding pixels indicates that the region likely includes a known logo. In one embodiment, discrepancies that exceed predetermined thresholds can correspond to predefined levels of relative brightness and/or whiteness.

As yet another example of a generic logo feature, many proprietary rights logos are intended to stand out from the surrounding video content. Hence, sharp edges corresponding to abrupt spatial or temporal changes in pixel values can be detected. Logo cues can be based on such edges as regions that include them have an increased likelihood of including a reference logo. Determining if a region includes an edge can comprise calculating a spatial or temporal gradient of pixel values within the region, with a gradient of relatively high magnitude indicating an edge. In some embodiments, the mask generator 125 calculates a spatial gradient on time-averaged pixel values (averaged over some predetermined window of time). The mask generator 125 can also use the Canny edge detection algorithm or Sobel operator to detect edges in a region.

After analyzing 320 a region, the mask generator 125 determines 325 a scaling factor for the region. The scaling factor is proportional to an absolute or relative likelihood that the region includes a proprietary rights logo. The scaling factor is based at least in part on evaluated logo cues for the region. The mask generator 125 determines 325 the scaling factor as a function of the evaluated logo cues. In one embodiment, the function is a weighted sum of the evaluated logo cues. The weight for a logo cue can be assigned directly as a design choice. In other embodiments, the mask generator 125 employs conventional machine-learning techniques (e.g., neural networks, logistic regression, support vector machines) to determine a weight for a logo cue. A variety of scaling factors are possible to emphasize a region with a high likelihood and/or deemphasize a region with a low likelihood of including a proprietary rights logo.

Once all (or a selected set of regions) are analyzed 320, the mask generator 125 then forms 330 a confidence mask for the video based on the determined 325 scaling factors for those regions. In one embodiment, the scaling factors are real numbers between zero and one, such as those illustrated in FIG. 2B. The confidence mask comprises a plurality of determined 325 scaling factors, each scaling factor associated with a region of the video.

Referring now to FIG. 2B, the example confidence mask 220 includes scaling factors for the example video frame 205 of FIG. 2A in accordance with one embodiment. The regions of the example video frame 205 that include the people 250 have scaling factors of zero because, among other factors, motion of the people 250 causes pixel values in these regions to have a high temporal variance. The regions of the example video frame 205 above or below the horizon 255 that did not include the people 250 have scaling factors of 0.1 because the pixels of these regions are static, but are not bright relative to their surrounding pixels and do not include any edges. The regions of the example video frame 205 that include the horizon 255 but not the people 250 have scaling factors of 0.4 because these regions are static and include edges, but are not bright relative to their surroundings. With one exception, regions 210a (the gray shaded regions) have scaling factors of one because they are static, include edges, and are bright relative to their surroundings. The exception is that one of the regions 210a has a scaling factor of 0.6 because it includes edges and is bright relative to its surroundings, but is not entirely static due to motion of one of the people 250. Hence, the scaling factors of the regions that included the example proprietary rights logo 215 are large relative to other regions. The scaling factors of the example confidence mask 220 illustrate how some characteristics of a region can influence the region's scaling factor, but other types of scaling factors based on one or more other generic logo features and associated logo cues are possible.

In one embodiment, the confidence mask is therefore analogous to a heat map for the video, with "hotter" regions of the video more likely to include a proprietary rights logo, and "colder" regions of the video less likely to include a proprietary rights logo. In one embodiment, the mask generator 125 transmits formed 330 confidence masks to the video database 135 where they are stored in association with corresponding videos.

Logo Detection

Figure 4:
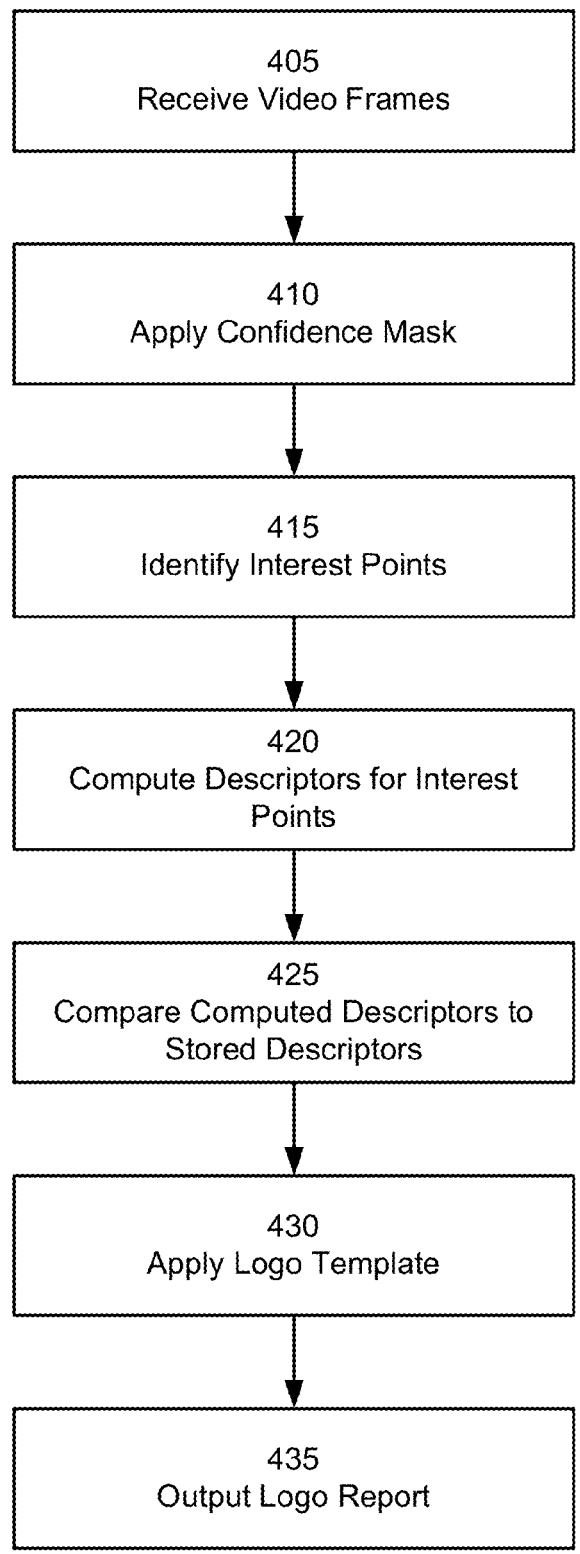
FIG. 4 illustrates one embodiment of a method for determining if a video includes one or more reference proprietary rights logos.

FIG. 4 is a flowchart illustrating the operations of the logo detector 130 to identify one or more reference proprietary rights logos within a video according to one embodiment. Other embodiments can perform one or more steps of FIG. 4 in a different sequence. Moreover, other embodiments can include additional and/or different steps than the ones described herein.

The logo detector 130 receives 405 video data comprising video frames for a video either from the video database 135 or from the mask generator 125. In one embodiment, the logo detector 130 applies 410 a corresponding confidence mask generated by the mask generator 125 to the video data to generate an altered video having altered video frames. As used herein, an altered video frame is a video frame with video data that has been scaled according to scaling factors included in a corresponding confidence mask.

Figure 5A:
FIG. 5A illustrates a video frame.
Figure 5B:
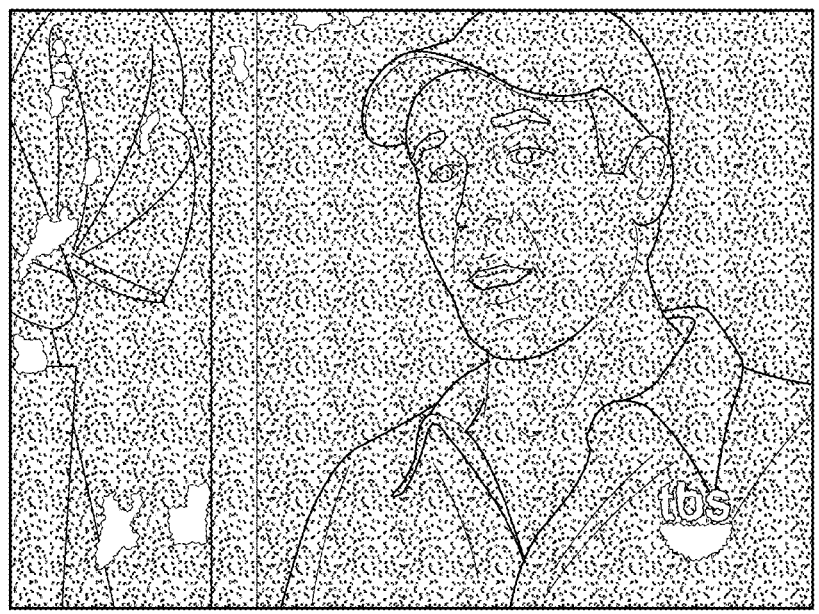
FIG. 5B illustrates an altered version of the video frame of FIG. 5A in accordance with one embodiment.

In one embodiment, applying 410 a confidence mask comprises performing a pixel-wise transformation of pixel values for the video data of a video region by a scaling factor associated with the region by the confidence mask. For example, if the scaling factor for region is zero, indicating that the likelihood of a logo being present in the region is zero, then the video data in that regions can be zeroed out by multiplication with the scaling factor. Such multiplication beneficially preserves frequency and gradient information encoded in the video data, allowing for more detailed subsequent analysis of the video data. FIG. 5A shows a frame of video before scaling, and FIG. 5B shows the corresponding altered frame after scaling by the confidence mask in accordance with one embodiment. As can be seen, some features of the altered frame, particularly the proprietary rights logo in the bottom right corner, are more prominent in the altered frame of FIG. 5B relative to the unaltered frame of FIG. 5A.

The logo detector 130 identifies 415 interest points in the altered video frames. An interest point comprises a computer-identifiable graphical feature that indicates contents of an image such as a corner, an intersection of two or more edges or lines, or a bright or dark spot. In one embodiment, the logo detector 130 identifies 415 interest points using Harris operators and multi-scale Harris operators (which search an image for corners and intersections by detecting points with maximally diverse gradients) or a Difference of Gaussians algorithm (which searches an image for dark and/or bright spots. Other conventional interest point detection techniques are possible. It should be noted that, in some embodiments, the mask generator 125, after forming 330 a confidence mask for a video frame, also applies 410 the confidence mask to the video frame so that the logo detector receives 405 previously altered video frames and proceeds directly to identifying 415 interest points.

Figure 5C:
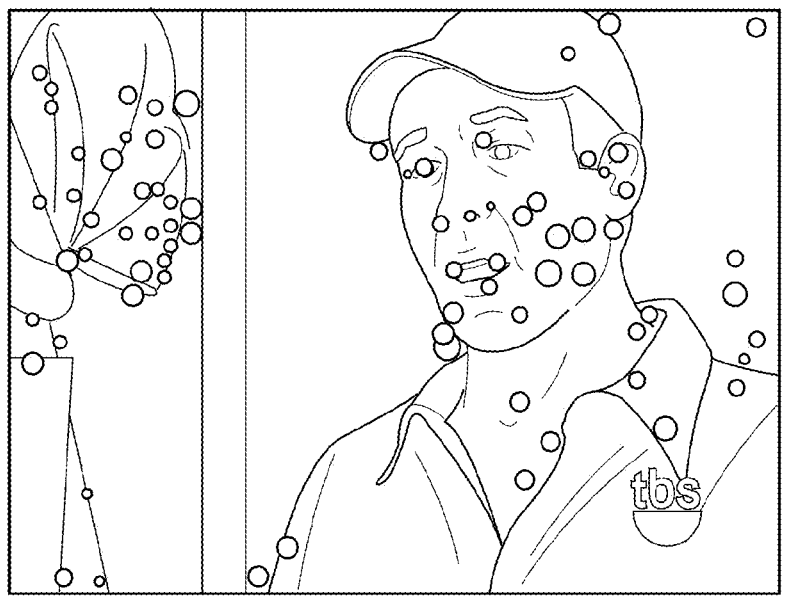
FIG. 5C illustrates interest points identified in the video frame of FIG. 5A in accordance with one embodiment.
Figure 5D:
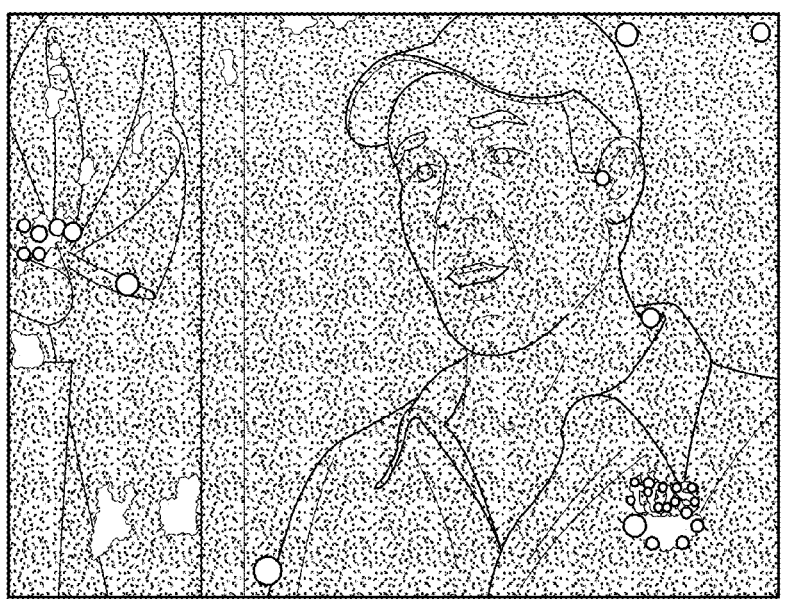
FIG. 5D illustrates interest points identified in the altered video frame of FIG. 5B in accordance with one embodiment.

FIGS. 5C and 5D illustrate a benefit of applying 410 the confidence mask to create the altered frame. In both FIG. 5C and FIG. 5D, the white circles indicate an interest point as identified 415 by the logo detector 130. In FIG. 5C, the logo detector 130 has attempted to identify 415 interest points in the unaltered video frame of FIG. 5A, resulting in a large number of interest point indicators in areas of the unaltered frame that do not contain the proprietary rights logo. In FIG. 5D, on the other hand, logo detector 130 has applied 410 the confidence mask and identified 415 interest points in the altered frame, resulting in a much more identifiable distribution with identified 415 interest points concentrated around the proprietary rights logo. Hence, application 410 of the confidence mask improves the efficiency and accuracy of subsequent processing steps carried out by the logo detector 130.

The logo detector 130 computes 430 a descriptor for each identified 415 interest point. In one embodiment, a descriptor comprises a feature vector of real numbers that describes visual characteristics of the video in an area proximate to the interest point. A number of descriptor types and associated algorithms can be utilized by the logo detector 130. In one embodiment, the logo detector 130 utilizes descriptors based on a Scale-Invariant Feature Transform (SIFT) algorithm, known as SIFT descriptors. The SIFT algorithm is further described in U.S. Pat. No. 6,711,293, which is incorporated by reference herein. The logo detector 130 can also utilize histogram of oriented gradient (HOG) descriptors. HOG descriptors are based on a count of specific gradient orientations in localized portions of an image.

Once descriptors have been computed 420 for any identified 415 interest points, the logo detector 130 compares 425 the computed 420 descriptors to stored descriptors of reference logos included in the logo model database 140. In one embodiment, comparing 425 a computed 420 descriptor to a stored descriptor comprises calculating a degree of similarity between the computed 430 descriptor and the stored descriptor. In one embodiment, the logo detector 130 calculates degrees of similarity using one or more distance functions such as Euclidean distance or nearest-neighbor search techniques such as hashing or kd-trees.

If a calculated degree of similarity for a stored descriptor exceeds a predetermined threshold, the logo detector then applies 430 a logo template for the reference logo associated with the stored descriptor to the altered video frames. Proprietary rights logos typically only appear in videos with certain positions, scales, and orientations within a video frame, and a logo template comprises data that enables the logo detector to determine if a position, scale, and/or orientation of an interest point is consistent with the reference logo for which a matching descriptor was computed 420. In one embodiment, a logo template comprises a plurality of descriptors, and applying 430 a logo template to a video frame comprises calculating a percentage with which descriptors for the video frame match the descriptors of the logo template (e.g. a fraction of descriptors for the logo template that match a descriptor in the video frame). Such a percentage is referred to herein as an overlap percentage. An overlap percentage in excess of a predetermined threshold indicates that the received 405 video frame includes the reference logo associated with the logo template with some measure of confidence.

Application 430 of logo templates beneficially prevents the logo detector 130 from falsely determining that a video frame includes a reference logo. For example, a received 405 video frame might include an interest point consistent with a number "5" rotated ninety degrees onto its side. In such a scenario, a computed descriptor 420 might match a stored descriptor for a reference logo that includes the number "5". However, application 340 of the logo template will result in an overlap percentage below the threshold because the interest point is at an improper orientation.

The logo detector 130 outputs 345 a logo report. In one embodiment, the logo report includes a number of detected reference logos. For each detected reference logo, the output 345 logo report can also include an identifier of the reference logo, a confidence measure that the video includes the reference logo, a duration for which the reference logo appears in the video, one or more times within the video playback that the reference logo appears, and an identity of an entity with ownership rights or otherwise associated with the reference logo. The duration is based upon a number of received 405 frames that are determined to include the reference logo. The confidence measure is based upon the overlap percentage for the applied 430 logo template. For example, a logo report may indicate that a first template for a first reference logo results in a match for 82% of descriptors and a second template for a second reference logo results in a match for 85% of descriptors. Hence, the video includes the first reference logo with an 82% confidence measure and includes the second reference logo with an 85% confidence measure.

In one embodiment, the logo detector 130 can adjust the various thresholds involved in the descriptor comparison 425 and/or logo template application 430 steps. The logo detector 130 can also repeat steps outlined above in reference to FIG. 3 with differing threshold levels. For example, the logo detector can perform a first pass on received 405 video frames with relative low thresholds for the comparison 425 and application 430 steps, and then perform subsequent passes with increased thresholds only on those video frames for which the initial low thresholds were exceeded. In other embodiments, the logo detector 130 executes some steps of FIG. 4 on only those video frames for which the initial low thresholds were exceeded to reduce processor 110 load and/or increase processor 110 speed.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting and identifying proprietary rights logos in videos through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for detecting at least one known logo in a video, the video comprising a plurality of regions, each region comprising video data, the method executed by at least one computer system and comprising:
   generating a confidence mask comprising a plurality of scaling factors, each scaling factor corresponding to a region of the video and indicating a likelihood that the corresponding region of the video includes a logo;
   applying the scaling factors of the confidence mask to the video data for the corresponding regions of the video to generate an altered video; and
   determining from the altered video a confidence measure as to whether the video includes a known logo.

2. The method of claim 1, wherein generating a confidence mask comprises determining whether pixel values for a first group of pixels are substantially constant over a duration of time relative to pixel values for a second group of pixels proximate to the first group of pixels.

3. The method of claim 1, wherein generating a confidence mask comprises determining whether a region of the video includes an edge.

4. The method of claim 3, wherein determining whether a region of the video includes an edge comprises calculating a spatial or temporal gradient for pixel values.

5. The method of claim 3, wherein determining whether a region of the video includes an edge comprises:
   calculating time-averaged pixel values; and
   calculating a spatial or temporal gradient for time-averaged pixel values.

6. The method of claim 1, wherein generating a confidence mask comprises:
   calculating a motion vector for a pixel; and
   determining whether a magnitude of the motion vector is below a threshold.

7. The method of claim 1, further comprising applying a noise filter to the video to create a reduced-noise video file.

8. The method of claim 1, wherein applying the scaling factors of the confidence mask to the video data for the corresponding regions of the video to generate an altered video further comprises scaling pixels values for a region by an associated scaling factor.

9. The method of claim 8, wherein scaling pixels values for a region by an associated scaling factor comprises performing a pixel-wise multiplication of pixel values in the region by the associated scaling factor.

10. The method of claim 1, wherein determining from the altered video a confidence measure as to whether the video includes a known logo further comprises determining that an observed position, scale, or orientation of the interest point corresponds to a known position, scale, or orientation of a known logo.

11. The method of claim 10, wherein determining that an observed position, scale, or orientation of the interest point corresponds to a known position, scale, or orientation of the known logo comprises:
   overlaying a frame of the altered video including the interest point with a stored template for the known logo; and
   computing a degree of correlation between the stored template and the frame of the altered video.

12. The method of claim 1, further comprising calculating a duration of appearance for the known logo.

13. The method of claim 12, further comprising outputting a logo report including at least one selected from the group consisting of: a number of known logos detected, the confidence measure for each detected known logo, and the duration of appearance for each detected known logo.

14. A non-transitory computer-readable storage medium storing computer executable code, the computer-executable code when executed by a processor causing the processor to perform a process for detecting at least one known logo in a video, the video comprising a plurality of regions, each region comprising video data, the process comprising:
  generating a confidence mask comprising a plurality of scaling factors, each scaling factor corresponding to a region of the video and indicating a likelihood that the corresponding region of the video includes a logo;
  applying the scaling factors of the confidence mask to the video data for the corresponding regions of the video to generate an altered video; and
  determining from the altered video a confidence measure as to whether the video includes a known logo.

15. The non-transitory computer-readable storage medium of claim 14, wherein generating a confidence mask comprises determining whether pixel values for a first group of pixels are substantially constant over a duration of time relative to pixel values for a second group of pixels proximate to the first group of pixels.

16. The non-transitory computer-readable storage medium of claim 14, wherein generating a confidence mask comprises determining whether a region of the video includes an edge.

17. The non-transitory computer-readable storage medium of claim 16, wherein determining whether a region of the video includes an edge comprises calculating a spatial or temporal gradient for pixel values.

18. The non-transitory computer-readable storage medium of claim 16, wherein determining whether a region of the video includes an edge comprises:
  calculating time-averaged pixel values; and
  calculating a spatial or temporal gradient for time-averaged pixel values.

19. The non-transitory computer-readable storage medium of claim 14, wherein generating a confidence mask comprises:
  calculating a motion vector for a pixel; and
  determining whether a magnitude of the motion vector is below a threshold.

20. The non-transitory computer-readable storage medium of claim 14, the process further comprising applying a noise filter to the video to create a reduced-noise video file.

21. The non-transitory computer-readable storage medium of claim 14, wherein applying the scaling factors of the confidence mask to the video data for the corresponding regions of the video to generate an altered video further comprises scaling pixels values for a region by an associated scaling factor.

22. The non-transitory computer-readable storage medium of claim 21, wherein scaling pixels values for a region by an associated scaling factor comprises performing a pixel-wise multiplication of pixel values in the region by the associated scaling factor.

23. The non-transitory computer-readable storage medium of claim 14, wherein determining from the altered video a confidence measure as to whether the video includes a known logo further comprises determining that an observed position, scale, or orientation of the interest point corresponds to a known position, scale, or orientation of a known logo.

24. The non-transitory computer-readable storage medium of claim 23, wherein determining that an observed position, scale, or orientation of the interest point corresponds to a known position, scale, or orientation of the known logo comprises:
  overlaying a frame of the altered video including the interest point with a stored template for the known logo; and
  computing a degree of correlation between the stored template and the frame of the altered video.

25. The non-transitory computer-readable storage medium of claim 14, further comprising calculating a duration of appearance for the known logo.

26. The non-transitory computer-readable storage medium of claim 24, further comprising outputting a logo report including at least one selected from the group consisting of: a number of known logos detected, the confidence measure for each detected known logo, and the duration of appearance for each detected known logo.

* * * * *